United States Patent
Kim

(10) Patent No.: US 9,742,706 B2
(45) Date of Patent: Aug. 22, 2017

(54) METHOD FOR SETTING CAPACITY OF BUFFER

(71) Applicant: LSIS CO., LTD., Anyang-si, Gyeonggi-do (KR)

(72) Inventor: Hyung Lae Kim, Pyeongtaek-si (KR)

(73) Assignee: LSIS CO., LTD., Anyang-si (KR)

( * ) Notice: Subject to any disclaimer, the term of this patent is extended or adjusted under 35 U.S.C. 154(b) by 306 days.

(21) Appl. No.: 14/575,978

(22) Filed: Dec. 18, 2014

(65) Prior Publication Data

US 2015/0180804 A1  Jun. 25, 2015

(30) Foreign Application Priority Data

Dec. 24, 2013 (KR) ........................ 10-2013-0162133

(51) Int. Cl.
*H04L 12/12* (2006.01)
*H04L 12/861* (2013.01)

(52) U.S. Cl.
CPC ................. *H04L 49/9005* (2013.01)

(58) Field of Classification Search
CPC .................................................. H04L 49/9005
USPC ................... 370/412, 428, 413, 389
See application file for complete search history.

(56) References Cited

U.S. PATENT DOCUMENTS

| | | | |
|---|---|---|---|
| 2004/0027997 A1* | 2/2004 | Terry | H04L 47/10 370/276 |
| 2015/0153374 A1* | 6/2015 | Balakrishnan | G01P 13/00 702/178 |

* cited by examiner

*Primary Examiner* — Dang Ton
(74) *Attorney, Agent, or Firm* — Lee, Hong, Degerman, Kang & Waimey

(57) ABSTRACT

The present invention is directed to method for setting capacity of a buffer, the method including an initializing step of initializing a plurality of sub-buffers forming a main buffer, a comparison data reception step of receiving a storage frequency and a remaining capacity from the plurality of sub-buffers and comparing the storage frequency with the remaining capacity, a data comparison step of determining whether a current storage frequency of the plurality of sub-buffers and a past storage frequency are equal, a set capacity calculation step of calculating an allocation capacity of the plurality of sub-buffers, and a capacity re-setting step of re-setting the capacity of the plurality of sub-buffers using the calculated allocation capacity.

7 Claims, 4 Drawing Sheets

METHOD FOR SETTING CAPACITY OF BUFFER

CROSS-REFERENCE TO RELATED APPLICATIONS

Pursuant to 35 U.S.C. §119(a), this application claims the benefit of earlier filing date and right of priority to Korean Patent Application No. 10-2013-0162133, filed on Dec. 24, 2013 the contents of which are all hereby incorporated by reference herein in their entirety.

BACKGROUND OF THE DISCLOSURE

Field

The teachings in accordance with the exemplary embodiments of this present disclosure generally relate to a method for setting capacity of buffer, and more particularly to a method for setting capacity of buffer configured to efficiently use a buffer by proactively setting a buffer capacity in response to a use environment.

Background

A communication system uses a buffer for preventing loss of transmitting/receiving messages generated in the course of processing the transmitting/receiving messages by a CPU.

FIG. 1 is a schematic view illustrating a buffer use state in a communication system according to prior art.

Referring to FIG. 1, the conventional communication system is formed therein with a buffer (1) for communication (hereinafter referred to as 'communication buffer'). The communication buffer (1) may include a transmission buffer (2) and a reception buffer (3), where a sum of a capacity of the transmission buffer (2) and a capacity of the reception buffer (3) is a total amount of the communication buffer (1). Thus, when a capacity of the transmission buffer (2) and a capacity of the reception buffer (3) are added, the addition takes up 100% of the entire communication buffer (1).

At this time, generation frequency of transmission/reception messages is changed depending on an environment the communication system is used, and a communication device developer or user must set a resistor or a parameter according to the message generation frequency to determine a capacity of transmission buffer and a capacity of reception buffer.

In general, the communication system is configured such that when a capacity of one buffer is fully loaded in a transmission buffer and a reception buffer, a message is so set as to be disposed from a message reception function or a transmission message generation function, even if a capacity of the other buffer is remain left. Although a problem of disposing of a message can be solved because a capacity can be appropriately set and changed when a developer or a user sets a buffer capacity, there is a problem of the size of the buffer must be changed by a user because the frequency of transmission/reception messages is frequently changed at all times. Furthermore, there is no solution when a capacity of buffer cannot be changed by a user through parameter setting.

SUMMARY OF THE DISCLOSURE

The present disclosure is provided to solve the aforementioned conventional problems and the present disclosure provides a method for setting capacity of buffer (hereinafter referred as "buffer capacity setting method, or simply the method") configured to efficiently use a buffer by proactively setting a buffer capacity in response to a use environment, and to be used for setting a capacity of a transmission buffer and a capacity of a reception buffer of a communication system.

In one general aspect of the present disclosure, there is provided a method for setting capacity of buffer configured to store a transmission message or a reception message, the method comprising:

initializing a plurality of sub-buffers forming a main buffer, when it is determined that a capacity setting program is first implemented by determining whether the capacity setting program is first implemented (initializing step);

receiving a storage frequency and a remaining capacity from the plurality of sub-buffers, when it is determined that the capacity setting program is not first implemented (comparison data reception step);

determining whether a current storage frequency of the plurality of sub-buffers and a past storage frequency are equal by comparing the current storage frequency of the plurality of sub-buffers and the past storage frequency (data comparison step);

calculating an allocation capacity of the plurality of sub-buffers, when the current storage frequency of the plurality of sub-buffers and the past storage frequency are unequal (set capacity calculation step); and re-setting the capacity of the plurality of sub-buffers using the allocation capacity calculated by the setting capacity calculation step (capacity re-setting step).

Preferably, but not necessarily, the initializing step may include initializing the plurality of sub-buffers by setting each capacity of the plurality of sub-buffers equal.

Preferably, but not necessarily, the initializing step may include determining whether the capacity setting program is first implemented after initializing the plurality of sub-buffers.

Preferably, but not necessarily, the method may further comprise setting the current storage frequency of the plurality of sub-buffers as a past storage frequency when the set capacity calculating step is finished Preferably, but not necessarily, the set capacity calculating step may be realized through processes of calculating a current utilization of the plurality of sub-buffers, calculating an accumulated utilization of the plurality of sub-buffers, calculating an expected use capacity and an expected remaining capacity of the main buffer and calculating a newly set capacity of the plurality of sub-buffers.

Preferably, but not necessarily, the data comparison step may include ending a buffer capacity setting operation by determining that there is no change in data when the current storage frequency is equal to the past storage frequency.

Preferably, but not necessarily, the main buffer may be a communication buffer for communication system and the plurality of sub-buffers may include a transmission buffer used for transmission of a message and a reception buffer used for receiving a message.

ADVANTAGEOUS EFFECTS

The method for setting capacity of buffer according to the exemplary embodiments of the present disclosure has an advantageous effect in that a buffer can be efficiently used by proactively setting a buffer capacity in response to a use environment.

Another advantageous effect is that a buffer can be proactively set in response to utilization and use frequency to thereby prevent a data loss generated in the course of using a fixed buffer capacity.

DETAILED DESCRIPTION OF THE DISCLOSURE

Features and advantages of the exemplary embodiments will be or will become apparent to one of ordinary skill in the art upon examination of the following figures and detailed description. In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Although the method for setting capacity of buffer according to an exemplary embodiment of the present disclosure has been explained using a case applied for setting a transmission buffer capacity and a reception buffer capacity for transmission/reception in a communication system, the present disclosure may be used for all devices using a buffer in addition to a communication system, and even if the number of buffers increases, the method can be used by partially correcting the below-explained following Equations.

Figure 1:
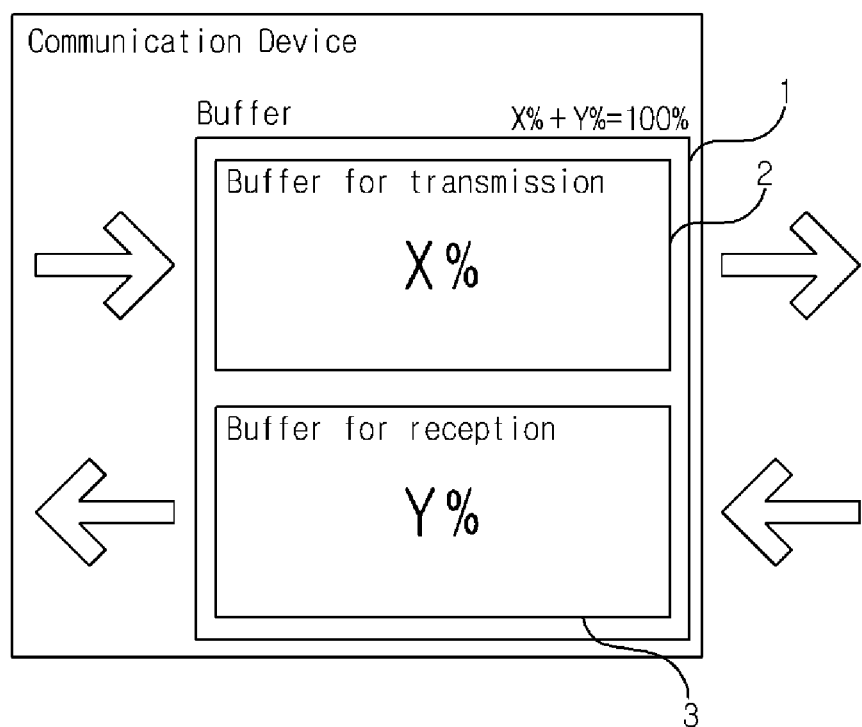
FIG. 1 is a schematic view illustrating a buffer use state in a communication system according to prior art.
Figure 2:
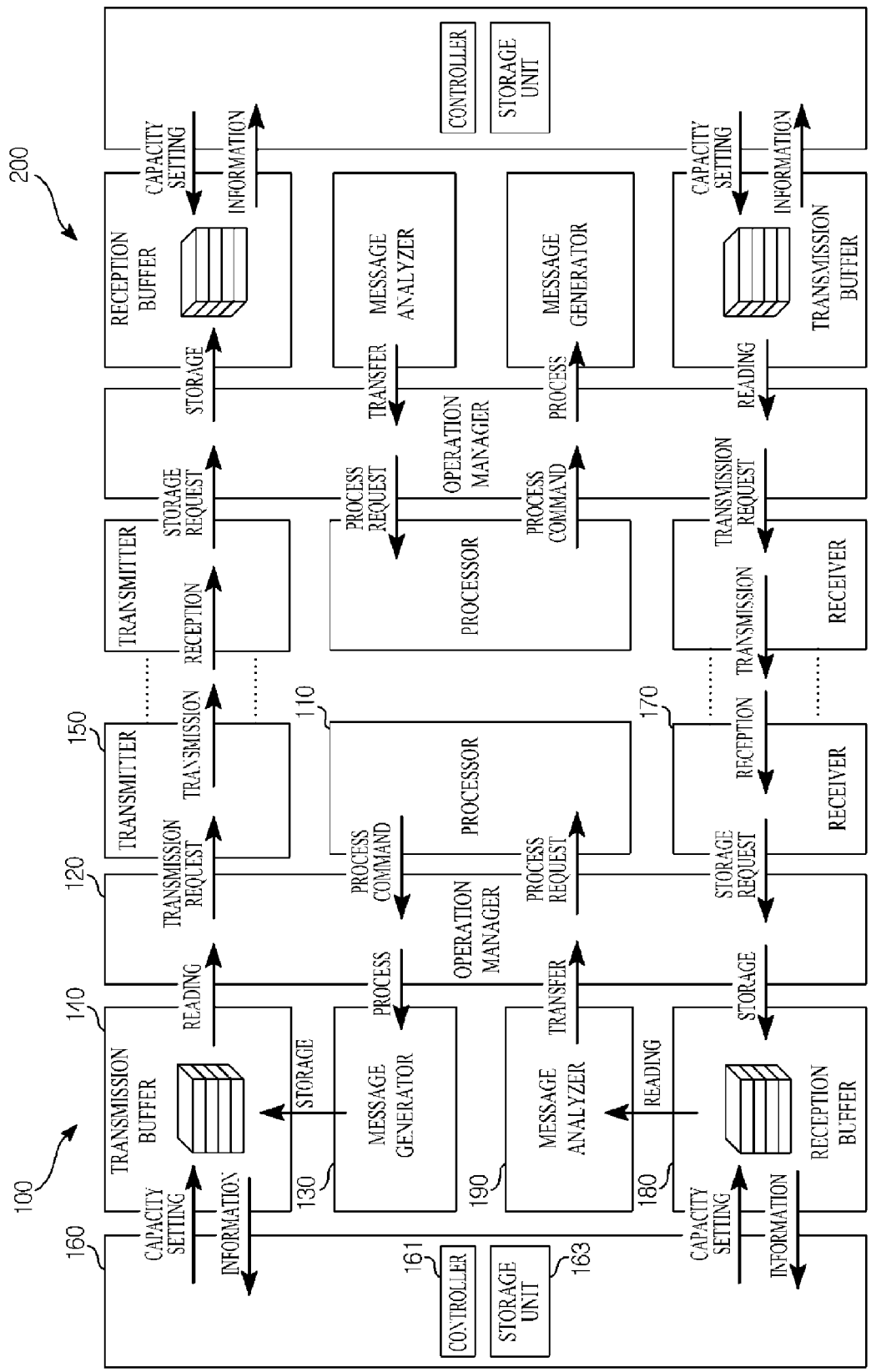
FIG. 2 is a block diagram illustrating a structure for message transmission/reception in a communication system according to an exemplary embodiment of the present disclosure.

FIG. 2 is a block diagram illustrating a structure for message transmission/reception in a communication system according to an exemplary embodiment of the present disclosure.

Hereinafter, a message transmission/reception operation in a communication system according to an exemplary embodiment of the present disclosure will be described with reference to FIG. 2. At this time, although FIG. 2 has illustrated two communication systems (100, 200) configured to transmit/receive mutual messages, explanation will be made only to one communication system (100), because configuration and function are same between using the two communication systems (100, 200) and using one communication system (100). Furthermore, blocks in FIG. 2 may define devices, and may define functions (programs) performing functions by being embedded in the devices. First, a message transmission in a communication system according to an exemplary embodiment of the present disclosure is realized through the following processes.

When a processor (110) of a communication system (100), e.g., a CPU, instructs an operation manager (120) to make a transmission message in order to transmit a data to another communication system (200), the operation manager (120) generates the transmission message using a message generator (130) in response to a command of the processor (110). At this time, the message generator (130) is stored with a transmission message generation function.

The transmission message generated by the message generator (130) is stored in a transmission buffer (140), and the operation manager (120) transmits the transmission message stored in the transmission buffer (140) to another communication system (200) through a transmitter (150). At this time, the transmitter (150), which is a communication module for transmission and reception with the another communication system (200), processes the transmission message in compliance with communication protocol, and transmits the transmission message to the another communication system (200).

Furthermore, the communication system (100) according to an exemplary embodiment of the present disclosure may include a buffer capacity setting unit (160) configured to change the capacity of the transmission buffer (140) in response to quantity of transmission message stored in the transmission buffer (140). The transmission buffer (140) accumulates a storage frequency whenever the transmission messages are stored.

Next, the message reception in the communication system according to an exemplary embodiment of the present disclosure is realized through the following processes.

The communication system (100) receives a message transmitted from another communication system (200) through a receiver (170), and the operation manager (120) stores the received message ('reception message') in a reception buffer (180). The reception message stored in the reception buffer (180) is transmitted to a message analyzer (190), where the message analyzer (190) classifies only the essential data using an analysis function for analyzing the reception message, and the classified message is transmitted to the processor (110) through the operation manager (120). Furthermore, the buffer capacity setting unit (160) may change the capacity of the reception buffer (180) in response to quantity of reception message stored in the reception buffer (180). Furthermore, the reception buffer (180) may accumulate the storage frequency whenever the reception messages are stored.

That is, the buffer capacity setting unit (160) of the communication system (100) according to an exemplary embodiment of the present disclosure can change the capacity of the transmission buffer (140) and the capacity of the reception buffer (180) in response to the quantity of transmission message stored in the transmission buffer (140) and the reception message stored in the reception buffer (180).

Figure 3:
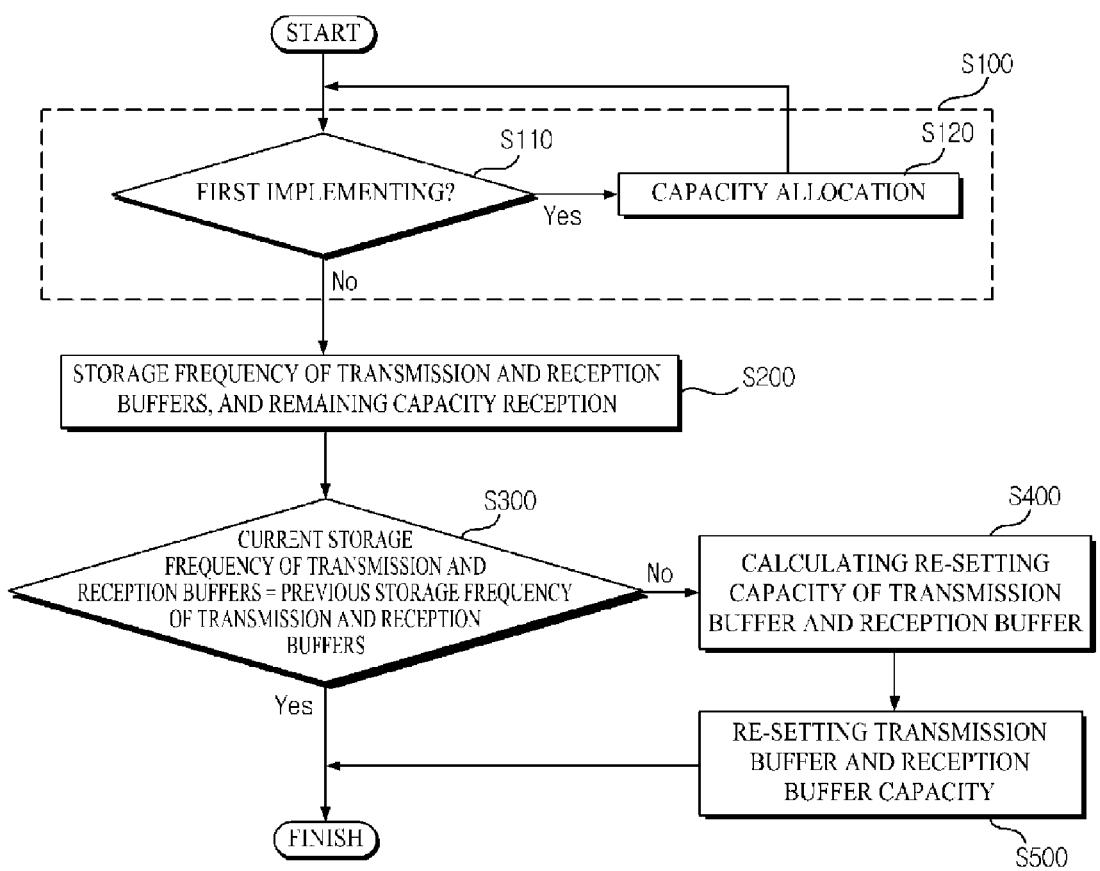
FIG. 3 is a flow chart illustrating a method for setting capacity of buffer in a communication system according to an exemplary embodiment of the present disclosure.

FIG. 3 is a flow chart illustrating a method for setting capacity of buffer in a communication system according to an exemplary embodiment of the present disclosure, where capacity setting of transmission and reception buffers is realized by the buffer capacity setting unit (160).

Referring to FIG. 3, the buffer capacity setting unit (160) determines whether a capacity setting program has been first implemented to realize an initialization step (S100) that initializes a transmission buffer and a reception buffer.

At this time, the initialization step (S100) may include a determination step (S110) checking if a setting program is first implemented, and a capacity allocating step (S120) allocating 50% of a total buffer capacity to the transmission buffer and the reception buffer respectively when the set program is first implemented (S100—Yes).

When the capacity allocation step (S120) is finished, flow returns to the determination step S110 to check if the set program has been first implemented. Thus, the transmission buffer (140) and the reception buffer (180) may be set to have a same capacity in order to occupy 50% of the total buffer capacity respectively.

Successively, if it is determined at S100 that the set program has not been first implemented, a comparison data reception step (S200) is realized that receives a remaining capacity and storage frequency from the transmission buffer (140) and the reception buffer (180). Next, a data comparison step (S300) is realized by comparing and determining if the currently received storage frequency of the transmission buffer (140) and the reception buffer (180) is same as the previously received storage frequency of the transmission buffer (140) and the reception buffer (140).

Thus, the buffer capacity setting unit (160) may include a controller (161) for comparing the currently received storage frequency of the transmission buffer (140) and the reception buffer (180) with the previously received storage frequency of the transmission buffer (140) and the reception buffer (140). The buffer capacity setting unit (160) may include storage unit (163) for storing the remaining capacity and the storage frequency received from the transmission buffer (140) and the reception buffer (180).

At this time, the controller (161) may receive the remaining capacity and the storage frequency from the transmission buffer (140) and the reception buffer (180) by transmitting a data request signal to the transmission buffer (140) and the reception buffer (180). The controller (161) may also receive, from the storage unit (163), the previous storage frequency of the transmission buffer (140) and the reception buffer (180) stored in the storage unit (163) by transmitting the data request signal to the storage unit (163).

If it is determined at the data comparison step S300 that the currently received storage frequency of the transmission buffer (140) and the reception buffer (180) is same as the previously received storage frequency of the transmission buffer (140) and the reception buffer (140), it is determined that there is no change in data, and the setting operation relative to the capacity of communication capacity is finished.

If it is determined at the data comparison step S300 that the currently received storage frequency of the transmission buffer (140) and the reception buffer (180) is different from the previously received storage frequency of the transmission buffer (140) and the reception buffer (140), a set capacity calculation step (S400) is realized to calculate the allocation capacity of the transmission buffer (140) and the reception buffer (180). At this time, when the set capacity calculation step S400 is finished, the storage frequency of the currently stored transmission buffer and reception buffer is converted to the previous value, which is utilized when a program is re-started.

Successively, when the set capacity calculation step (S400) is finished, a capacity re-setting step S500 is realized to re-set the capacity of the transmission buffer (140) and the reception buffer (180) using the allocation capacity of the transmission buffer (140) and the reception buffer (180) calculated at the set capacity calculation step S400. At this time, a new allocation capacity of the transmission buffer (140) and the reception buffer (180) at the set capacity calculation step S400 may be determined by the following Equation 1. The Equation 1 is an equation to calculate a newly set capacity of the transmission buffer and the reception buffer, and Equations 2 to 5, which are calculated in percentage value, are equations for converting to buffer capacity value of actually used unit.

$$Sb_{Tx} = (Tb_{Tx} - Rb_{Tx}) + \left\{ NRr_{Tb} \times \left( \frac{Ar_{Tx}}{Ar_{Tx} + Ar_{Rx}} \right) \right\} \quad \text{<Equation 1>}$$

$$Sb_{Rx} = (Tb_{Rx} - Rb_{Rx}) + \left\{ NRr_{Tb} \times \left( \frac{Ar_{Rx}}{Ar_{Tx} + Ar_{Rx}} \right) \right\}$$

where, $Sb_{TX}$ is a transmission buffer capacity to be newly set, $Tb_{TX}$ is a total transmission buffer capacity, $Rb_{TX}$ is a remaining transmission buffer capacity, $NRr_{Tb}$ is an accumulated transmission/reception buffer sum average remaining amount, $Ar_{TX}$ is an accumulated transmission buffer use rate, $Ar_{RX}$ is an accumulated reception buffer use rate, $Sb_{RX}$ is a reception buffer capacity to be newly set, $Tb_{RX}$ is a total reception buffer capacity and $Rb_{Rx}$ is a remaining reception buffer capacity.

Meantime, the accumulated transmission/reception buffer sum average remaining amount ($NRr_{Tb}$) of Equation 1 may be determined by the following Equation 2.

$$NRr_{Tb} = Tb_{TRx} - (NR_{Tx} + NR_{Rx}) \quad \text{<Equation 2>}$$

where, $Tb_{TRX}$ is a total transmission/reception buffer capacity, $NR_{TX}$ is an accumulated transmission buffer average use amount, $NR_{RX}$ is an accumulated reception buffer average use amount, where the accumulated transmission buffer average use amount ($NR_{TX}$) and the accumulated reception buffer average use amount ($NR_{RX}$) may be obtained by the following Equation 3.

$$NR_{Tx} = Tb_{Tx} - (Tb_{Tx} \times Ar_{Tx})$$

$$NR_{Rx} = Tb_{Rx} - (Tb_{Rx} \times Ar_{Rx}) \quad \text{<Equation 3>}$$

where, $Tb_{TX}$ is a total transmission buffer capacity, $Ar_{TX}$ is an accumulated transmission buffer use rate, $Tb_{RX}$ is a total reception buffer capacity, and $Ar_{RX}$ is an accumulated reception buffer use rate.

The Equations 2 and 3 are used to make information for setting transmission/reception buffer capacity, where an estimated use capacity of buffer is calculated by accumulated use rate of transmission/reception buffers, and a capacity expected to remain is calculated less the buffer use capacity expected from a total buffer size.

Meantime, the accumulated transmission buffer use rate ($Ar_{TX}$) and the accumulated reception buffer use rate ($Ar_{RX}$) may be determined by the following Equation 4. The Equation 4 is to calculate a transmission/reception buffer accumulated use rate, where accumulation is made by adding use capacity percentage conversion value of transmission/reception buffers calculated by Equation 5, and the accumulated value is divided by average accumulation frequency.

Equation 4 obtains a value divided by 2 because one previous use capacity percentage conversion value and a currently used capacity percentage conversion value are used, where the divided value is determined by how many previous use capacity percentage conversion values are used.

If the divided value increases, response to buffer capacity change becomes delayed when transmission buffer and reception buffer use rates are reversed. However, when data temporarily increases, capacity allocated to each buffer is made to change little by little.

Conversely, if the divided value decreases, response to buffer capacity change becomes quickened when use rate of the transmission/reception buffers reverse. However, when data temporarily increases, capacity allocated to each buffer is made to change rapidly.

$$Ar_{Tx} = \frac{\sum_{k=1}^{\infty} \frac{R_{Txk}}{R_{Txk} + R_{Rxk}} \times \{(100 - R_{Txk}) + (100 - R_{Rxk})\}}{2} \quad \langle \text{Equation 4} \rangle$$

$$Ar_{Rx} = \frac{\sum_{k=1}^{\infty} \frac{R_{Rxk}}{R_{Rxk} + R_{Txk}} \times \{(100 - R_{Txk}) + (100 - R_{Rxk})\}}{2}$$

where, $R_{TX}$ is a transmission buffer use rate, $R_{RX}$ is a reception buffer use rate, k is a frequency of implementing algorithm, where the transmission buffer use rate ($R_{TX}$) and the reception buffer use rate ($R_{RX}$) may be obtained from the following Equation 5.

The Equation 5 is to calculate a current transmission/buffer use rate where a use capacity of transmission/reception buffers is converted to percentage.

$$R_{Txn} = \frac{Tb_{Txn} - Rb_{Txn}}{Tb_{Txn}} \times 100(\%) \quad \langle \text{Equation 5} \rangle$$

$$R_{Rxn} = \frac{Tb_{Rxn} - Rb_{Rxn}}{Tb_{Rxn}} \times 100(\%)$$

where, $Tb_{TX}$ is a total transmission buffer capacity, $Rb_{TX}$ is a remaining capacity of transmission buffer, $Tb_{RX}$ is a total capacity of reception buffer, $Rb_{RX}$ is a remaining capacity of reception buffer, and n is an implementing frequency of algorithm (n=1, 2, 3, . . . ∞).

Figure 4:
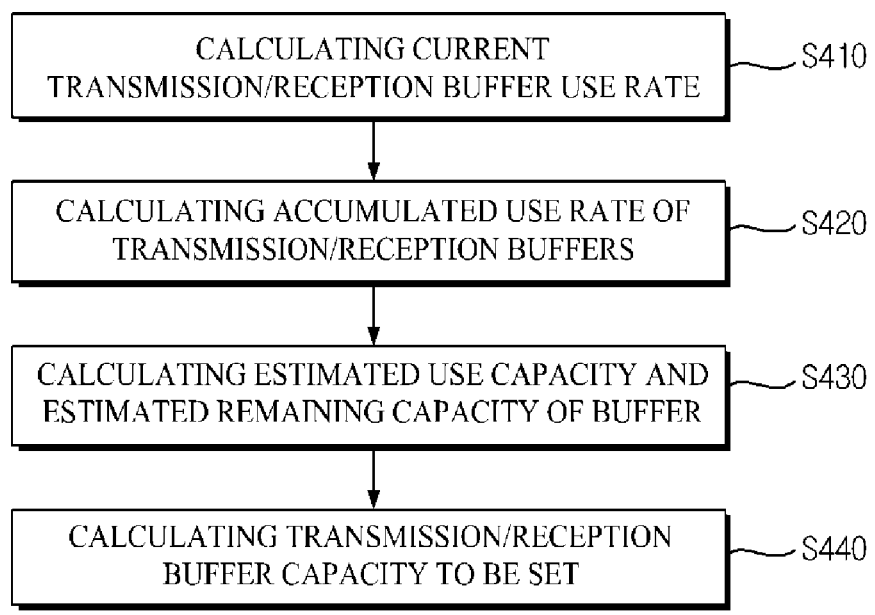
FIG. 4 is a detailed flow chart illustrating a set capacity calculation step in a method for setting capacity of buffer according to an exemplary embodiment of the present disclosure.

FIG. 4 is a detailed flow chart illustrating a set capacity calculation step in a method for setting capacity of buffer according to an exemplary embodiment of the present disclosure.

Referring to FIG. 4, the set capacity calculation step (S400) may be realized by calculating a current transmission/reception buffer use rate (S410), calculating an accumulated transmission/reception buffer use rate (S420), calculating estimated buffer use capacity and estimated remaining capacity (S430), and calculating a newly set transmission/reception buffer capacity (S440).

According to the present disclosure, a buffer can be efficiently managed by proactively setting capacity of transmission buffer and capacity of reception buffer using transmission buffer capacity and reception buffer capacity of the communication system in response to a current transmission buffer capacity, a current reception buffer use capacity, and use frequency.

Thus, the proactive setting of buffers in response to use capacity and use frequency can prevent data loss that may be generated when a fixed buffer capacity is used. The buffer capacity setting method is not limited to the communication system, but can be usefully applicable to seeing a main buffer comprised of plurality of sub-buffers.

Although the method for setting capacity of buffer has been described and explained according to exemplary embodiments, the present disclosure is not limited to a particular exemplary embodiment but many alternatives, modifications, and variations will be apparent to those skilled in the art within the metes and bounds of the claims.

Therefore, it should be understood that the above-described embodiments are not limited by any of the details of the foregoing description, unless otherwise specified, but rather should be construed broadly within the scope as defined in the appended claims

What is claimed is:

1. A method for setting capacity of a buffer configured to store a transmission message or a reception message in a communication system, the method comprising:
   determining whether a capacity setting program is implemented;
   initializing a plurality of sub-buffers forming a main buffer when it is determined that the capacity setting program is implemented;
   receiving a storage frequency and a remaining capacity from the plurality of sub-buffers when it is determined that the capacity setting program is not implemented;
   determining whether a current storage frequency of the plurality of sub-buffers is equal to a previous storage frequency of the plurality of sub-buffers by comparing the current storage frequency to the previous storage frequency;
   calculating an allocation capacity of the plurality of sub-buffers when the current storage frequency is not equal to the previous storage frequency and re-setting the capacity of the plurality of sub-buffers using the calculated allocation capacity.

2. The method of claim 1, wherein initializing the plurality of sub-buffers comprises setting a capacity of each of the plurality of sub-buffers equal.

3. The method of claim 1, further comprising initializing the plurality of sub-buffers before determining whether the capacity setting program is implemented.

4. The method of claim 1, further comprising setting the current storage frequency equal to the previous storage frequency after calculating the allocation capacity.

5. The method of claim 1, wherein calculating the allocation capacity comprises:
   calculating a current utilization of the plurality of sub-buffers;
   calculating an accumulated utilization of the plurality of sub buffers;
   calculating an expected use capacity and an expected remaining capacity of the main buffer;
   and calculating a new capacity of the plurality of sub-buffers.

6. The method of claim 1, wherein determining whether the capacity setting program is implemented comprises ending a buffer capacity setting operation by determining that there is no change in data when the current storage frequency is equal to the previous storage frequency.

7. The method of claim 1, wherein:
   the main buffer is a communication buffer for the communication system; and
   each of the plurality of sub-buffers includes a transmission buffer used for transmitting a message and a reception buffer used for receiving a message.

* * * * *